United States Patent
Tanach et al.

(10) Patent No.: US 11,570,257 B1
(45) Date of Patent: Jan. 31, 2023

(54) COMMUNICATION PROTOCOL, AND A METHOD THEREOF FOR ACCELERATING ARTIFICIAL INTELLIGENCE PROCESSING TASKS

(71) Applicant: NeuReality Ltd., Caesarea (IL)

(72) Inventors: Moshe Tanach, Bet Herut (IL); Yossi Kasus, Haifa (IL); Lior Khermosh, Givatayim (IL); Udi Sivan, Zikhron Yaakov (IL)

(73) Assignee: NEUREALITY LTD., Caesarea (IL)

( * ) Notice: Subject to any disclaimer, the term of this patent is extended or adjusted under 35 U.S.C. 154(b) by 8 days.

(21) Appl. No.: 17/387,536

(22) Filed: Jul. 28, 2021

Related U.S. Application Data

(60) Provisional application No. 63/070,054, filed on Aug. 25, 2020.

(51) Int. Cl.
| | |
|---|---|
| *H04L 67/148* | (2022.01) |
| *G06F 9/50* | (2006.01) |
| *G06F 9/48* | (2006.01) |
| *G06F 15/173* | (2006.01) |
| *H04L 67/133* | (2022.01) |

(52) U.S. Cl.
CPC .......... *H04L 67/148* (2013.01); *G06F 9/4806* (2013.01); *G06F 9/505* (2013.01); *G06F 15/17331* (2013.01); *H04L 67/133* (2022.05)

(58) Field of Classification Search
CPC ... H04L 67/148; H04L 67/133; G06F 9/4806; G06F 9/505; G06F 15/17331
See application file for complete search history.

(56) References Cited

U.S. PATENT DOCUMENTS

| | | | |
|---|---|---|---|
| 8,621,627 B1 * | 12/2013 | Eiriksson | H04L 63/0236 709/250 |
| 2009/0064291 A1 * | 3/2009 | Wahl | H04L 67/02 726/5 |
| 2021/0011863 A1 * | 1/2021 | Zhang | G06F 17/153 |
| 2021/0116907 A1 * | 4/2021 | Altman | H04W 4/44 |
| 2021/0258405 A1 * | 8/2021 | Chourasia | H04L 67/02 |
| 2021/0334542 A1 * | 10/2021 | Shankar | G06K 9/6276 |

* cited by examiner

*Primary Examiner* — Michael A Keller
(74) *Attorney, Agent, or Firm* — M&B IP Analysts LLC.

(57) ABSTRACT

A system and method for communicating artificial intelligence (AI) tasks between AI resources are provided. The method comprises establishing a connection between a first AI resource and a second AI resource; encapsulating a request to process an AI task in at least one request data frame compliant with a communication protocol, wherein the at least one request data frame is encapsulated at the first AI resource; and transporting the at least one request data frame over a network using a transport protocol to the second AI resource, wherein the transport protocol provisions the transport characteristics of the AI task, and wherein the transport protocol is different than the communication protocol.

22 Claims, 10 Drawing Sheets

COMMUNICATION PROTOCOL, AND A METHOD THEREOF FOR ACCELERATING ARTIFICIAL INTELLIGENCE PROCESSING TASKS

CROSS-REFERENCE TO RELATED APPLICATIONS

This application claims the benefit of U.S. Provisional Application No. 63/070,054 filed on Aug. 25, 2020, the contents of which are hereby incorporated by reference.

TECHNICAL FIELD

The disclosure generally relates to communications network access, and the acceleration of the processing of AI tasks within a network environment.

BACKGROUND

The demand and need for efficient AI processing systems, in terms of AI computing performance, power and cost, are increasing. These needs and demands are due in part to the increased popularity of machine learning and AI applications. The execution of such applications is performed by servers configured as a dedicated AI server or AI appliance, including software and hardware. The software may be, for example, TensorFlow®, Caffe, Pytorch® or CNTK®, usually implementing the framework's APIs. The hardware may be, for example CPU or a combination of CPU and a dedicated hardware accelerator, also known as a deep learning accelerator (DLA). The DLA may be, for example, GPU, ASIC or FPGA devices.

Although the DLA computation is typically implemented in hardware, the management and control of the computation is performed in software. Specifically, in an architecture that includes several dedicated hardware (HW) accelerators there is an increased need to manage and control the jobs to be executed by the different accelerators. The management and control tasks are typically performed by an asset of software processes responsible for various functions, such as multiple tasks queue management, scheduling of jobs, drivers that interface and control the hardware programming model, etc. As such, the functionality and the performance of the entire DLA's architecture is sometimes limited by the host CPU running these processes in software.

To better utilize AI compute resources in the cloud and enterprise datacenters, a disaggregation approach is being introduced. Here, primary compute resources and AI compute resources are logically and physically being disaggregated and located in separate locations in the datacenter. This allows a dynamic orchestration of the virtual machines executing AI applications on primary compute servers, as well as the AI compute resources running AI tasks on AI servers. AI tasks include, for example, machine learning, deep learning, and neural network processing tasks, for various types of applications, for example, natural language processing (NLP), voice processing, image processing, and video processing, with various usage models, for example recommendation, classification, prediction, and detection. In addition, tasks can also include preprocessing and postprocessing computation, for example, image (jpeg) decoding, non-maximum suppression (NMS) after object detection and the like.

As compute resources are disaggregated, and datacenters are being distributed, the communication between the various resources is now a performance bottleneck as it is still performed by traditional communication protocols, such as Hypertext Transfer Protocol (HTTP) over Transmission Control Protocol (TCP) or GRPC. This approach requires high CPU resources (e.g., due to networking software stack and the networking drivers) and adding redundant latency to the processing pipeline.

The traditional communication protocols are not designed to efficiently support AI computing tasks. As such, datacenters designed to support AI compute resources cannot be fully optimized to accelerate execution of AI tasks, due to the latency and low performance of the traditional communication protocols that are not being optimized to support AI compute tasks to the clients. An optimized protocol allows to increase the efficiency of the primary/AI disaggregation in terms of latency, performance, power, and overheads as well as introducing end to end quality of service features such as service level agreement (SLA) based communication, load balancing and the like.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for communicating artificial intelligence (AI) tasks between AI resources. The method comprises establishing a connection between a first AI resource and a second AI resource; encapsulating a request to process an AI task in at least one request data frame compliant with a communication protocol, wherein the at least one request data frame is encapsulated at the first AI resource; and transporting the at least one request data frame over a network using a transport protocol to the second AI resource, wherein the transport protocol provisions transport characteristics of the AI task, and wherein the transport protocol is different than the communication protocol.

Certain embodiments disclosed herein include a system configured as artificial intelligence (AI) task execution. The system comprises a processing circuitry; and a memory, the memory containing instructions that, when executed by the processing circuitry, configure the system to establish a connection with a second AI resource; encapsulate a request to process an AI task in at least one request data frame compliant with a communication protocol; and transport the at least one request data frame over a network using a transport protocol to the second AI resource, wherein the transport protocol provisions the transport characteristics of the AI task, and wherein the transport protocol is different than the communication protocol.

Certain embodiments disclosed herein include a system configured as artificial intelligence (AI) task execution, comprising: a processing circuitry; and a memory, the memory containing instructions that, when executed by the processing circuitry, configure the system to encapsulate a response resulted in the processing of an AI task in at least one response data frame compliant with a communication protocol; and transport the at least one response data frame over a network using a transport protocol to a second AI resource, wherein the transport protocol provisions transport characteristics of the AI task, and wherein the transport protocol is different than the communication protocol.

BRIEF DESCRIPTION OF THE DRAWINGS

The subject matter disclosed herein is particularly pointed out and distinctly claimed in the claims at the conclusion of the specification. The foregoing and other objects, features and advantages of the disclosure will be apparent from the following detailed description taken in conjunction with the accompanying drawings.

DETAILED DESCRIPTION

Figure 1:
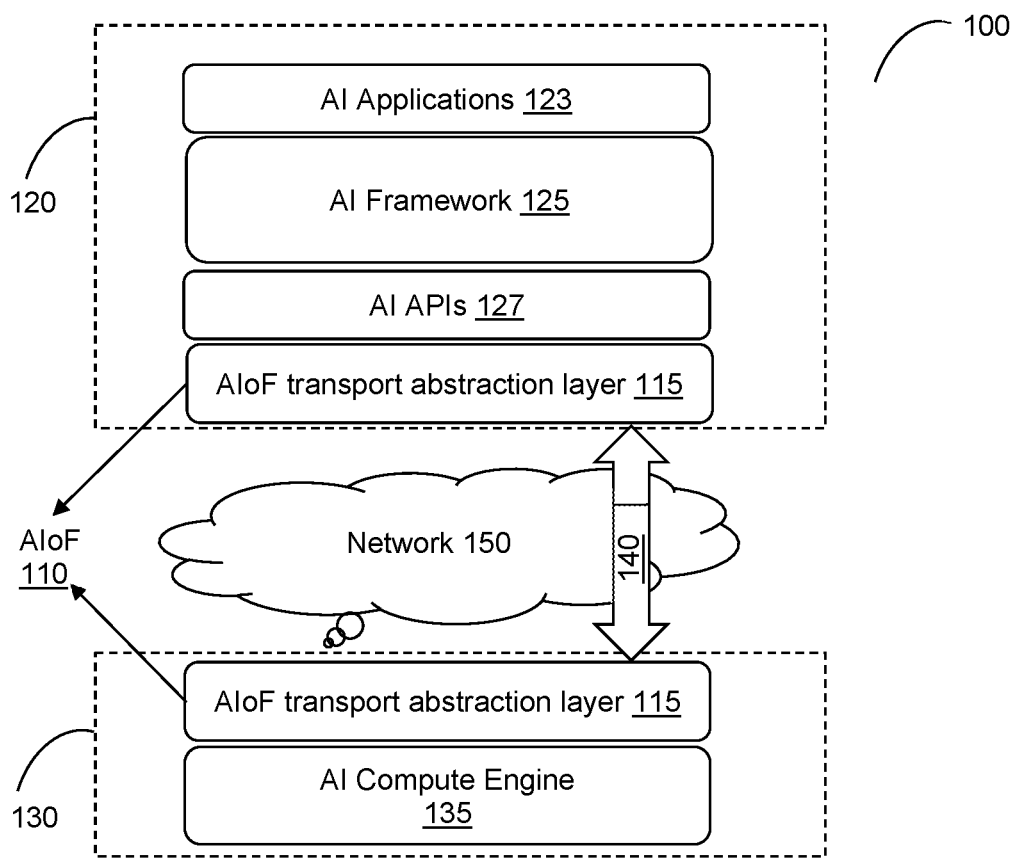
FIG. 1 is a block diagram illustrating the communication facilitated by an AI over Fabric (AIoF) protocol according to an embodiment.

The embodiments disclosed by the invention are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a communication protocol, and method thereof allowing for high performance, low latency, and low overhead connectivity between artificial intelligence (AI) compute resources over a high-speed network fabric. The disclosed protocol further allows end to end performance assurance, quality of service (QoS), provision and orchestration of the AI services. The disclosed communication protocol is referred to hereinafter as "AI over Fabric protocol" or "AIoF protocol".

The disclosed AIoF protocol enables standardized communication among several compute resources, including, a server and a client that respectively perform or respond to execution of the AI computing tasks. A server may include an AI primary compute server hosting AI applications or other applications, and the AI compute server executes AI tasks (or simply an AI task or AI job). A client may include any application or object that is utilizing the AI server for AI task offload. AI tasks include, for example, machine learning, deep learning, and neural network processing tasks, for various type of applications, for example, natural language processing (NLP), voice processing, image processing, and video processing, with various usage models, for example, recommendation, classification, prediction, and detection. In addition, tasks can also include preprocessing and postprocessing computation, for example, image (jpeg) decoding, non-maximum suppression (NMS) after object detection, and the like.

The purpose of the AIoF protocol is to define an alternative communication connectivity, to a conventional processing protocol, designed to remove processing overheads and any associated latency. In an embodiment, the AIoF protocol is operable as a mediator between AI frameworks and AI computation engines. The AIoF protocol transmits and receives data frames over standard transport-layer protocols.

FIG. 1 shows an example diagram 100 illustrating the communication facilitated by the AIoF protocol according to an embodiment.

The AIoF protocol (schematically labeled as "110") is configured to facilitate the communication between an AI client 120 and an AI server 130. The AI client 120 is an application, an object, and/or device utilizing the AI server 130 to offload AI tasks. The AI server 130 is an application, object, and/or device serving the AI client 120 by offloading AI task requests and responding with results. It should be noted that the AI client 120, the AI server 130, or both, can be realized in software, firmware, middleware, hardware, or any combination thereof.

Typically, the AI client 120 would include a runtime framework 125 to execute AI applications 123. The framework 125 may be realized using technologies including, but not limited, TensorFlow, Caffe2, Glow, and the like, all are standardized AI frameworks or any proprietary AI framework. The AI client 120 is also configured with a set of AI APIs 127 to support standardized communication with the AI compute engine 135 at the AI server 130.

The disclosed AIoF protocol 110 is a communication protocol designed to support AI models installations and AI operations (collectively may be referred to AI computing tasks). The AIoF protocol 110 is configured to remove the overhead of a transport protocol, latency issues, and the multiple data copies required to transfer data between the AI client 120 and server 130.

In an embodiment, the AIoF protocol 110 is configured using a shared memory over network, in which the application can use its memory while the hardware transparently copies the AI model or the data from the application memory to a network attached artificial intelligence accelerator (NA-AIA) memory via the network. As will be discussed below, the AIoF protocol provides end-to-end performance assurance and quality of service (QoS), as well as provision and orchestration of the AI services at the AI client 120.

To support the QoS, a plurality of end-to-end queues is defined for the protocol, the client, and the server to allow the level of marking to differentiate different users, flows, jobs, or queues and mark them for service priority (e.g., allowed rate, required latency, and the like). The AIoF protocol 110 includes a flow control mechanism to support multi-client multi-server topologies, that can balance traffic between multiple clients and multiple servers. The disclosed protocol further implements an end-to-end mechanism, for example a message-based flow control or a credit-based, and the like. The flow control mechanism also allows to control the resources and provision their compute usage, and avoid congestion on the compute resources, and further allows over provisioning of the compute resources.

According to the disclosed embodiments, the AIoF protocol 110 includes a transport abstraction layer 115 configured as part of the AI client 120 and server 130. The abstraction layer 115 is configured to fragment and de-fragment AIoF data frames, respectively, transmitted and received over a transport protocol 140. The format of an AIoF data frame is discussed in detail below.

Typically, the transport protocol 140 is responsible for data integrity and retransmission in case of congestion of the link and its queues. In a further embodiment, the AIoF protocol 110 controls the integrity of the AI Job execution and contains flow control and credit information that is exchanged between the end points to control the scheduling and availability of AI compute resources.

Different transport protocols are supported by the disclosed embodiments. The transport protocols may include a Transmission Control Protocol (TCP), a remote direct memory access (RDMA), a RDMA over converged Ethernet (RoCE), NVMe or NVMeoF, InfiniBand, and the like.

The communication between the AI client 120 and AI server 130 is over a network 150. The network 150 includes a collection of interconnected switches (not shown), allowing the connectivity between the AI client 120 and the AI server 130. In an example configuration, the switches may include, for example, Ethernet switches. The network 150 may be a local area network (LAN), a wide area network (WAN), a metropolitan area network (MAN), and the like. The physical medium may be either a wire or a wireless medium. Typically, when deployed in datacenter, the wire medium is a copper wire or an optical fiber.

The transport abstraction layers 115 of the AIoF protocol may support multiple communication channels to support the transfer of various types of data and priority of its data. A channel includes a separate header and control demarcations, and separate state of operations and flow control credit related to the channel. A channel can have separate data formats and separate queues. As such, over a channel it is possible to carry separately with an isolated manner a certain type of AI job traffic of that channel.

The list of channels may include, but are not limited to, a channel for an AI task data transfer, a channel for an AI model, a channel for control information, a channel for management, a channel for inference parameters (e.g., batch size level, required accuracy, optimization instructions/hints, unify layers, different tradeoffs), a channel for reliability and redundancy, and a channel for diagnostics and health (including, for example, a forward channel for diagnostic requests, an inference label channel to check accuracy, and a return channel for diagnostics and health of the AI operation), and the like.

Figure 8:
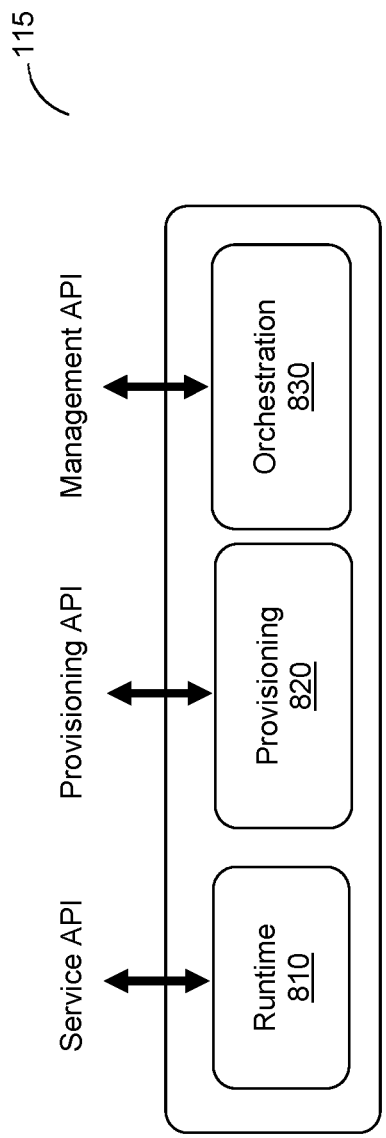
FIG. 8 is a block diagram of the AIoF transport abstraction layer according to an embodiment.

The health information includes task metrics (e.g., job succeeded/failed, statistics of the results), cluster/network metrics (e.g., load on the compute, net stats, etc.), and cluster redundancy metrics. The AI metrics include supervised metrics depending on labels like accuracy results and additional non-supervised AI metrics, such as clustering of inference data, data statistics (e.g., mean, variance, histograms), and algorithm specific metrics. An example diagram illustrating the elements of the transport abstraction layer 115 at the AI client 120 is shown in FIG. 8.

The AIoF protocol 110 can support and be operational in different network topologies and be implemented in various AI acceleration systems. One example for such a system is discussed below with reference to FIG. 7.

In yet another embodiment, the AIoF protocol 110 supports a switching topology, either fabric topology like a mesh or torus or other topology or through an indirect switching topology.

The supported topologies can be further utilized to transfer data over the AIoF protocol and those received at one AI server can be forwarded to another server. The specific AI server to forward the AI jobs (and data) may be designated in the AIoF data frame. The forwarding can be performed between components (e.g., CPU, AI accelerators) within the AI server. The forwarding can be performed before processing of the task data in the frame's payload, according to the header information of the AIoF data frame. Alternatively, the forwarding can be performed after some level of processing of the task data that is continued in another compute server. The forwarding information is provided in the AIoF header.

Figure 2:
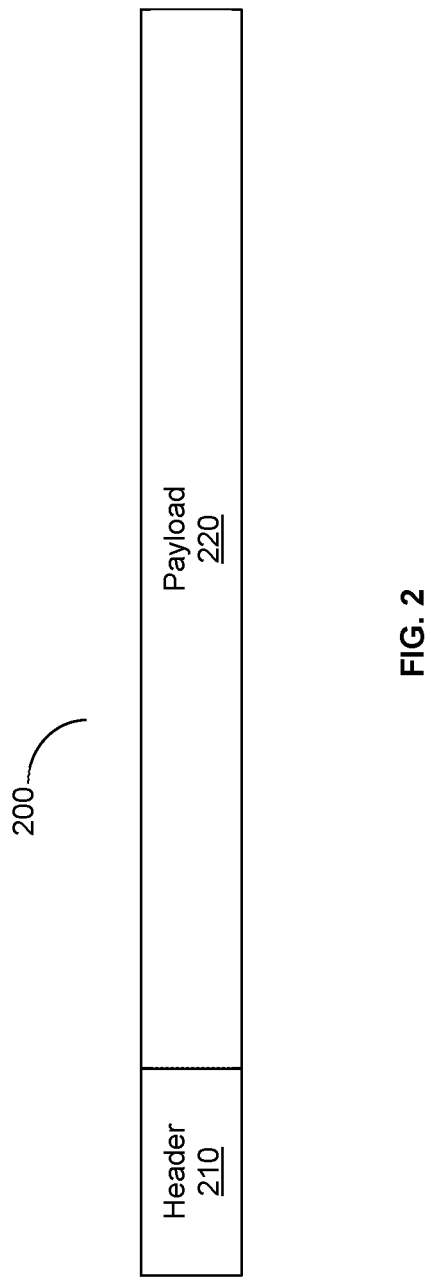
FIG. 2 is a diagram of an AIoF data frame structured by AIoF according to an embodiment.

FIG. 2 shows an example diagram of an AIoF data frame 200 structured by AIoF according to an embodiment. The AIoF data frame 200 complies with the AIoF protocol and is being utilized to transfer data of AI tasks, and results thereof. In an embodiment, AI tasks are fragmented and transferred over the one or more channels supported by the AIoF protocol. In an embodiment, the frame 200 is generated and processed by a transport abstraction layer (e.g., layer 115, FIG. 1) of the AIoF protocol.

The AIoF data frame 200 includes a header portion 210 and a payload portion 220. The payload portion 220 is structured to carry the data to run a specific AI task. For example, the AI task may include an image processing, then the data would be the image to be processed.

The header portion 210 includes a number of fields designating, in part, the AI task type, the length of the payload data, a source address (or identifier), and a destination address (or identifier). The header includes the meta-data information of the AI job, including elements that are required for the processing of the AIoF frame and the AI job, channel types, information like the identifier to the job and its sources, addresses for descriptors, job characteristics. Examples of the fields included in the header portion 210 of AIoF request frames and AIoF response frames are listed in Table 1 and Table 2, respectively.

TABLE 1

| Field Name | Description |
| --- | --- |
| VERSION | Version of descriptor |
| CHANNELS | An inference channel (Inference, Provisioning, Management Error/Debug, Statistics, Inter-server CG (Server chaining) |
| OPCODE | Command operation opcode (e.g., Single Job, Batch Job, Parallel Job, Admin) |
| CID | Client ID |
| CGID | Computational Graph (AI Mode) ID |
| CREDITS | AI Job credits-exchanged between RX channel, allowing the AI service to get TX credits for transmission. Credit information can be returned in all AIoF messages to the client. |
| STATUS | Indication provided in response. This field can be available instead of job info. |
| AI_FLOW_CONTROL | AI Job flow control information |
| JID | Job ID |
| JPRIO | Job priority (Strict, High, Medium, Low) |
| QID/FLOWID | (Optional) Direct targeting of Queue/Flow |
| TIME | (Optional) Time-for time sync |

TABLE 1-continued

| Field Name | Description |
| --- | --- |
| | and statistics calculations |
| INPUTLEN | Input data length |
| JOB_FRAG_DESC | Job fragmentation descriptor |
| JINFO_AVAIL | Job Information data is available in the header |
| BATCH_SIZE | Batch Size |
| JINFOPTR | Meta data pointer (Pointer to job related data, which is not actual job data) |
| JINFOLEN | Job information length |
| JINFO_R_KEY | R_KEY for JINFO data |
| IN_SGLSIZE | Input RDMA Scatter Gather List (SGL) size |
| SGL_INADRRPTR | Pointer to input data address |
| SGL_INLEN | SGL entry of input data length |
| SGL_IN_R_KEY | R_KEY for input SGL data |
| OUT_SGLSIZE | Output RDMA Scatter Gather list size |
| SGL_OUTADRRPTR | SGL pointer entry of result data address. First entry of results will be credits for following AI jobs. Credit information can be returned in all AIoF messages to the client. |
| SGL_OUTLEN | SGL entry of size of output buffer |
| SGL_OUT_R_KEY | SGL entry of R_KEY for output data |

TABLE 2

| Field Name | Description |
| --- | --- |
| VERSION | Version of descriptor |
| CHANNELS | An inference channel (Inference, Provisioning, Management Error/Debug, Statistics, Inter-server CG (Server Chaining)) |
| OPCODE | Command operation opcode (e.g., Single Job, Batch Job, Parallel Job, Admin) |
| CID | Client ID |
| CGID | Computational Graph (AI Mode) ID |
| AI_FLOW_CONTROL | AI Job flow control information |
| JID | Job ID |
| JPRIO | Job priority (Strict, High, Medium, Low) |
| HDRSIZE | 0-Short Header; 1-Long Header |
| CREDITS | AI Job credits-exchanged between RX channel, allowing the AI service to get TX credits for transmission. Credit information can be returned in all AIoF messages to the client. |
| STATUS | Indication provided in response. This field can be available instead of job info. |
| TIME | (Optional) Time-for time sync and statistics calculations |
| OUTLEN | Size of output buffer |
| PADSIZE | Byte size of padding including header size. Must be larger than 32. |
| JOB_FRAG_DESC | Job fragmentation descriptor |
| JINFOLEN | Job information length |
| JINFO | Additional job information-Statistics and additional metadata provided to the client side. |
| RESERVED | Reserved. Zero Padding for future extension. |
| CONGESTION_NOTIFICATION | Congestion notification from server to client. Higher value indicates larger congestion. Used in clients that connected to multiple servers on multiple AIoF connection to prefer less congested connection. |

AIoF data frame 200 is transported over a transport protocol, examples of which are provided above. When transported over a transport protocol (layer), the AIoF data frame 200 is fragmented into a number of consecutive transport layer packets, where the fragments of the AIoF frame are included in the payload portion of the transport layer packets.

In an embodiment, the format of the AIoF data frame 200 can be adaptive. That is, the frame may be modified with different header fields, a header size, a payload size, and the like, or combination thereof, to support different AI frameworks or applications. In an embodiment, the format of the data frame is negotiated, during an initialization handshake (or a discovery mode) between the AI client and server.

In one configuration, several predefined formats are defined by the AIoF protocol. The version of the format can also be for a specific job, or batch of jobs. In general, this flexible format can be deduced to a specific format that is selected between the two endpoints according to their capabilities, and the specific job that is currently processed.

Figure 3:
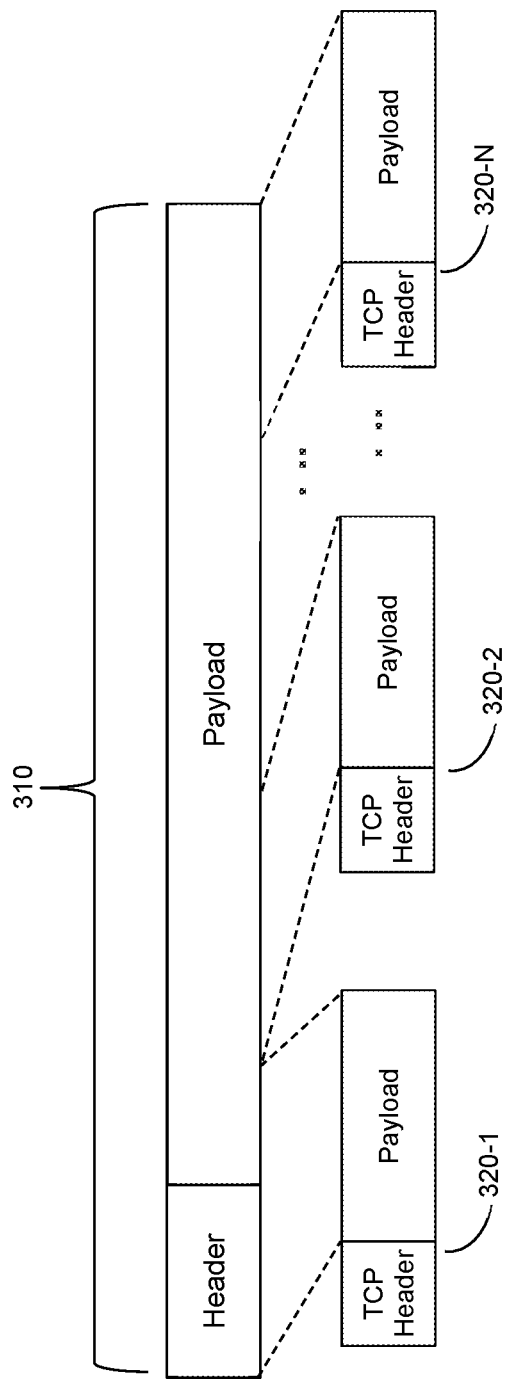
FIG. 3 is a diagram illustrating a transport of an AIoF frame over TCP according to an embodiment.

FIG. 3 shows an example diagram illustrating a transport of an AIoF data frame 310 over TCP packets 320-1 through 320-N. As illustrated, portions of the AIoF data frame 310 are carried by the respective payload of the packets 320-1 through 320-N. It should be noted that the size of the AIoF frame is larger than a size of the TCP packet. For example, a TCP packet's size is 100 bytes, while a size of AIoF data frame may be 1000 bytes.

Figure 4A:
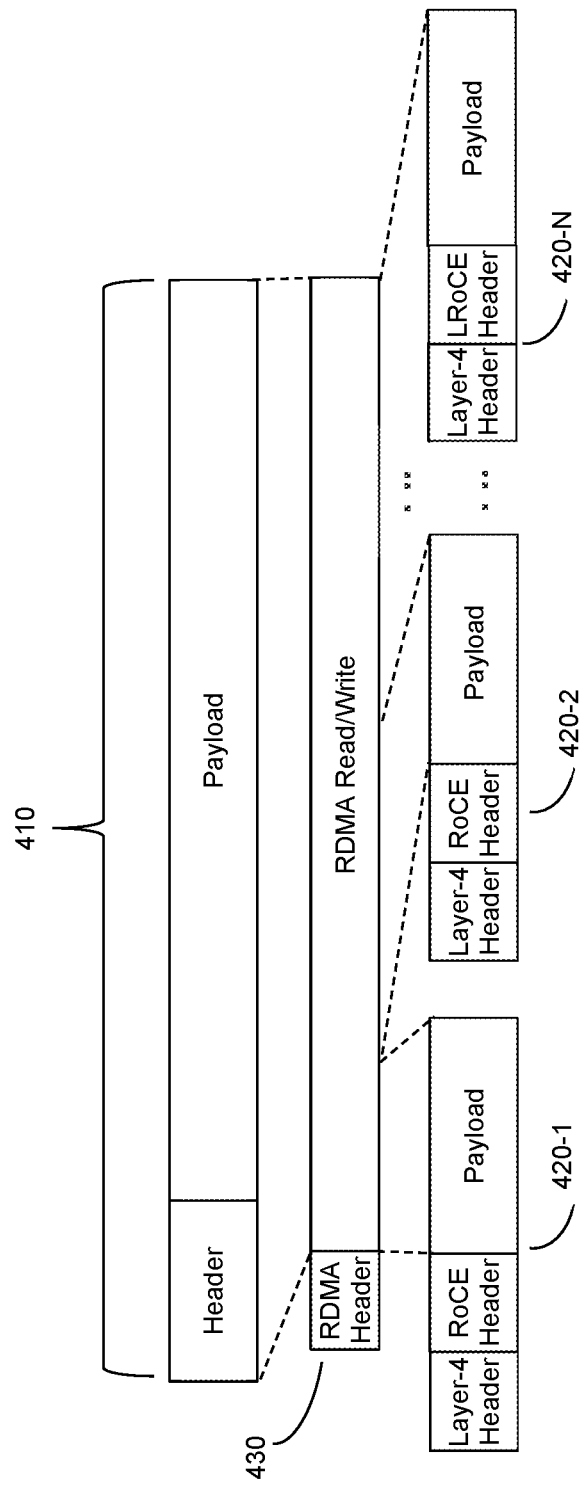
FIG. 4A is a diagram illustrating a transport of an AIoF data frame over RoCE according to an embodiment.

FIG. 4A is an example diagram for transporting an AIoF data frame 410 over RoCE packets 420-1 through 420-N according to an embodiment. The RoCE is a network protocol that leverages RDMA to allow devices to perform direct memory to memory transfers at the application level without involving the host CPU. A standard structure of RoCE packet 420 includes a layer-4 packet header (UDP), an RoCE header, and a RoCE payload. The AIoF data frame 410 is first encapsulated in a RDMA frame 430 and then into consecutive RoCE packets 420-1 through 420-N.

As illustrated in FIG. 4A, portions of the AIoF data frame 410 are carried out by the respective payload of RoCE packets 420-1 through 420-N. It should be noted that the size of the AIoF frame is larger than a size of the RoCE packet.

Figure 4B:
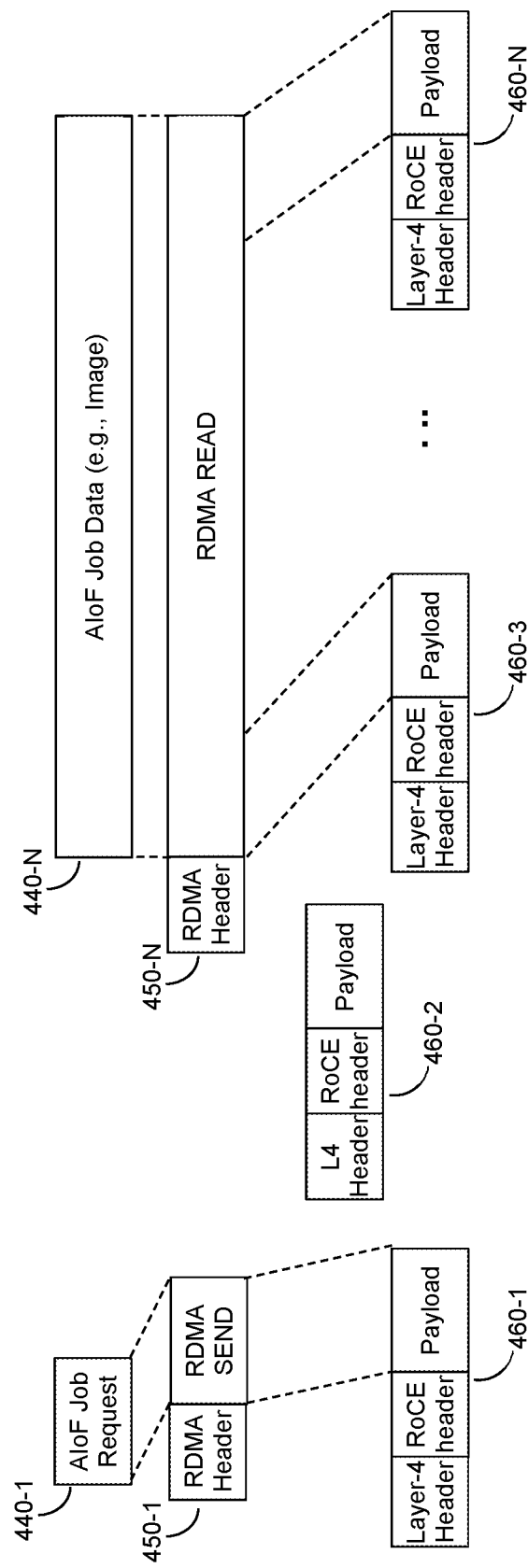
FIG. 4B is a diagram illustrating a transport of an AIoF data frame over RDMA including the AIoF basic handshaking, according to an embodiment.
Figure 6:
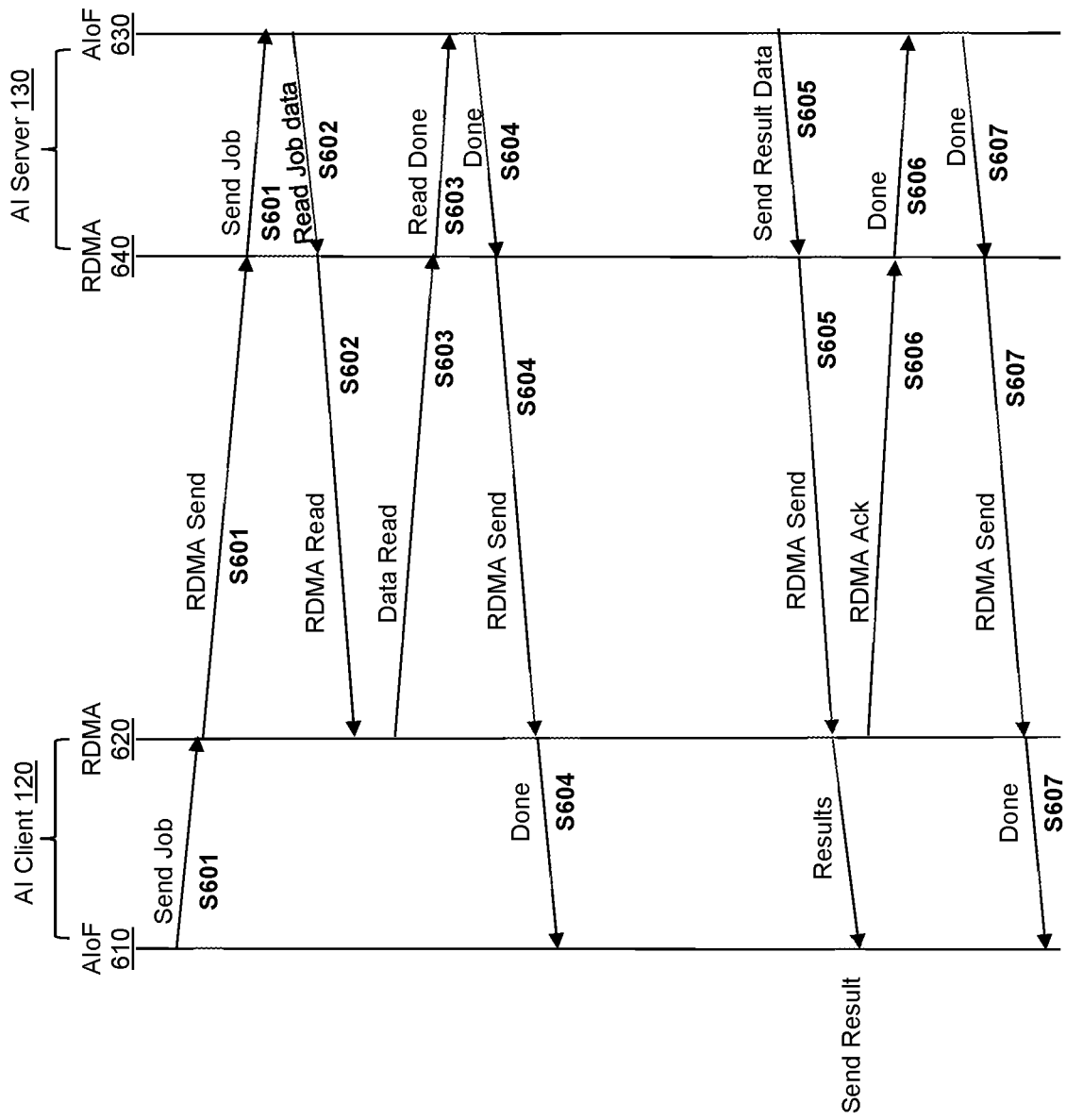
FIG. 6 is a flow diagram illustrating a dataflow between an AI client and an AI server using the AIoF protocol according to an example embodiment.

FIG. 4B is an example diagram of transporting an AIoF data frame 440-1 through 440-N over RoCE packets 460-1 through 460-N, following the AIoF handshake, according to an embodiment. An example diagram illustrating an AIoF handshake is shown in FIG. 6. In an example embodiment, the AIoF data frames 440-1 through 440-N are encapsulated in RDMA frames 450-1 through 450-N, more particularly, with specific commands such as SEND and READ in the payload of each packet. Portions of the AIoF frame are carried out by corresponding payloads of the RoCE packets 460-1 through 460-N. In an embodiment, the payload is read from the client using RDMA read operation that may include, but not limited to, read, read response, and the like. It should be noted that the AIoF frame header can be sent separately from the AIoF job data itself.

Figure 5:
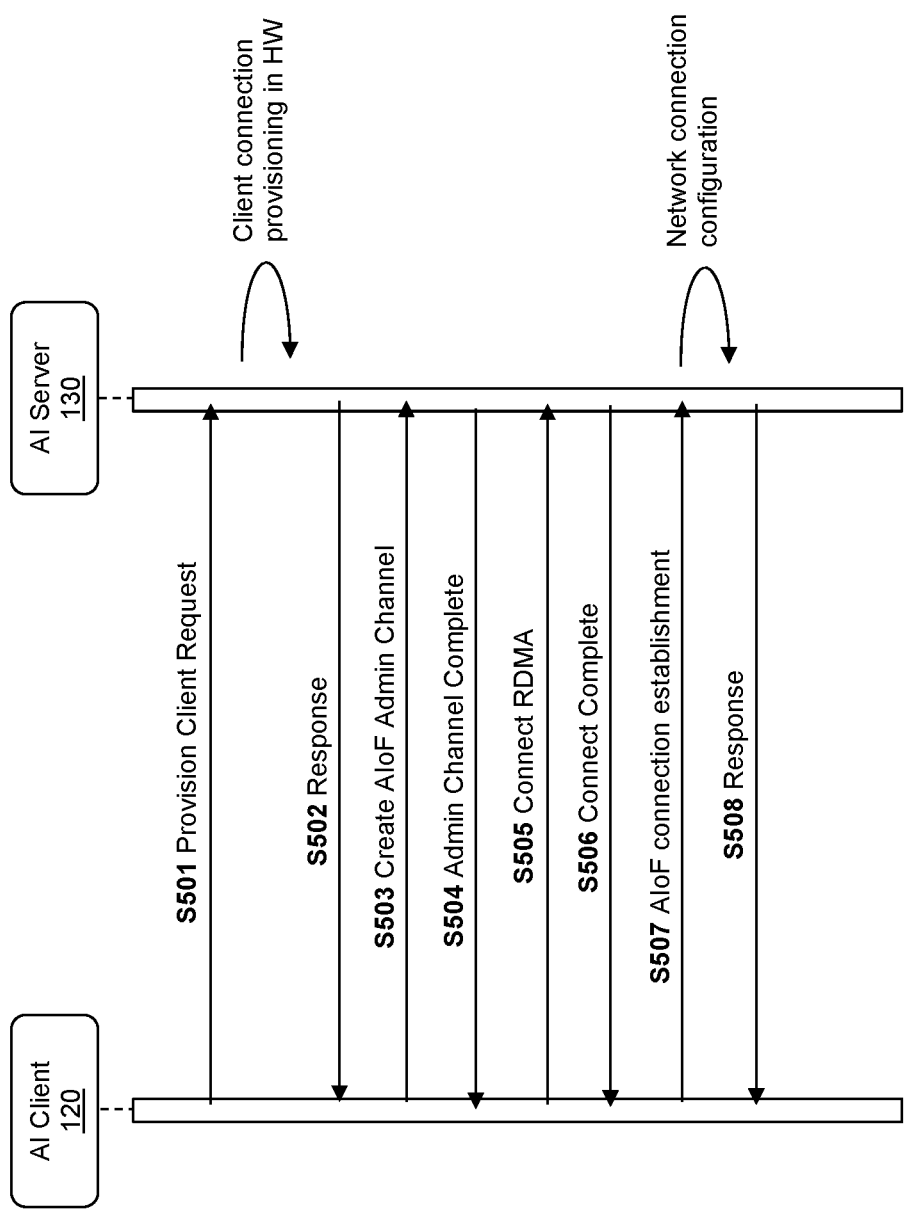
FIG. 5 is a flow diagram illustrating a process for establishing a connection between an AI client and an AI server according to an example embodiment.

FIG. 5 is an example flow diagram illustrating a method for establishing connection between an AI client 120 and an AI server 130 according to an embodiment. It should be noted that all steps may be optional and may be performed offline to enable the link to start with a pre-shared configuration.

At S501, a connection is initiated by the AI client 120, which sends a list of provision requests for new connection. The list of provisions may include, but are not limited to, a client ID, a computational graph service level agreement (CG_SLA), and a computational graph (CG) descriptor. The AI server 130 receives the list, and client connection provisioning occurs in the hardware. At S502, a response is sent by the AI server 130. The response may indicate success or failure of connection.

At S503, an AIoF administrator (Admin) channel creation is requested. Such a channel may be used for the initiation of the AIoF and transport protocol (e.g., RDMA) connections. The Admin channel may further regulate query and response messages for management and status updates such as, but not limited to, status and statistic gathering, state changes, and event alerts. In an embodiment, the Admin channel may resize on an RDMA and/or TCP. At S504, an administrator channel completion information is sent from the AI server 130 to the AI client 120.

At S505, the transport connection request is sent from the AI client 120 to the AI server 130. At S506, the connection completion information is sent from the AI server 130 to the AI client 120.

At S507, an AIoF connection message is sent from the AI client 120 to the AI server 130. Such connection message includes transient AIoF link connection information, but is not limited to, a client ID and computational graph ID (CG_ID). A network connection is configured at the AI server 130 for mapping between queue pair (QP), an input queue, a flow ID, Job_ID, credits, and AI Job Scatter Gather List (SGL) parameters. The Job ID is used for initialization and the credits are allocated for AIoF flow control. At S508, a response message is sent to the AI client 120 indicating success or failure of the AIoF connection establishment.

FIG. 6 illustrates an example flow diagram illustrating the dataflow between an AI client 120 and an AI server 130 using the AIoF protocol to transport AI computing tasks according to an embodiment. In the example shown in FIG. 6, the transport is over an RDMA serving as a transport layer. The AIoF and RDMA components at the client 120 side are labeled as 610 and 620, while the AIoF and RDMA components at the server 130 side are labeled as a 630 and 640, respectively.

It should be noted that the AIoF and RDMA components may include software stack and/or circuits configured to execute the various tasks related to the operation of the AIoF and RDMA protocol. The AIoF component (either 610 or 630) implements the abstraction layer (e.g., layer 115, FIG. 1).

The RDMA protocol provides the ability of accessing (read, write) memory on a remote system (e.g., AI client or server) without interrupting the processing of the CPUs on that system. There are a number of transfer commands in RDMA including: SEND—a request to send data; ACK—acknowledgment of a SEND request, WRITE—write data into a remote (virtual) memory, and READ—read data out of the remote (virtual) memory. These commands are used when the AIoF is carried over RDMA/RoCE. The flow describes the operation of the AIoF and it is in addition to the regular RDMA/RoCE handshake for initialization and regular operation.

In an embodiment, when using TCP/IP packets, the AIoF data frames are carried over Ethernet SEND/RECEIVE packets, encapsulated over TCP/IP, in addition to the regular TCP/IP message protocols. In this embodiment, the handshake can also be implemented over layer-7 protocols, such as HTTP or HTTP2, where the messages will be encapsulated over the framing of these protocols.

At S601, an AIoF frame is sent from the AI client 120 to the AI server 130. The AIoF frame is transported over the network using an RDMA SEND command. The AIoF frame (e.g., frame 200, FIG. 2) designates at least a client ID (CID), a memory address (or pointer) to a client memory where to read the task data from, a job (or task) ID (JID), and the task data to be processed. This is a request from the client to initiate a job which is afterwards followed by the RDMA READ command from the AI server 130. Alternatively, TX credits can be used, where such credits guarantee the client the ability to transmit the job if credit is available. This saves round-trip time (RTT) of the link latency for the job.

At S602, the AIoF component 630 sends an AIoF data frame ("read job data") including the job ID (JID) of the task requested by the client, and the client ID (CID). This AIoF data frame is translated to an RDMA READ request sent to the RDMA component 620, to directly read the task data from the client memory. At S603, the read task data is sent back to the server side AIoF component 630. For TCP/IP message will be carried with SEND frames.

At S604, when the processing of the AI task is completed by the AI server 130, another AIoF data frame ("done") is sent to the client side AIoF component 610 from the RDMA component 640. The frame is transferred by means of the RDMA SEND command. In an embodiment, such frame is configured to designate the client ID (CID) and job ID (JID). For TCP/IP message will be carried with SEND frames.

At S605, an AIoF data frame ("send result data") is issued by the server side AIoF component 630, such a command is translated to a RDMA SEND command to provide results to the AI client 120. In another embodiment, an AIoF data frame ("write result") is issued by the server side AIoF component 630, such a command is translated to an RDMA WRITE to write the result to the client's memory, indicated by the memory pointer (or address). RDMA WRITE may be an immediate WRITE to indicate the occurrence and completion of the WRITE operation to the AI client side 120. In an embodiment, TCP/IP messages are carried with SEND frames. If data is transferred by a SEND command, then data is copied to the designated address space afterwards at the client side 120.

In an embodiment, the "read results" and "write results" commands are tracked using a table that records the client ID (CID), an address (pointer) for the client's memory to write the results. Upon, a write request command, the address of the memory is retrieved from the table based on the client ID and job ID. If the address is invalid, an error message is returned. In an embodiment, the results are sent to the AI client 120 using an RDMA SEND operation, thus the tracking table is not required.

It should be noted that S605 and S606 may be iteratively performed multiple times until the entire results data are stored in the memory.

At S606, a RDMA ACK message is sent to the AI server 130, acknowledging the completion of the RDMA SEND and/or WRITE. For TCP/IP, message will be carried with SEND frames.

In an embodiment, where the SEND and WRITE messages are used to transfer the results, the AI client 120 is aware of process completion without any further messages. In an optional embodiment at S607, an AIoF data frame ("done") indicating the completion of the transaction, is sent to the client side AIoF component 610 from the AIoF component 630. In this example, the frame is transferred using an RDMA SEND. For TCP/IP, the message will be carried with SEND frames.

The AIoF components may be implemented in software, firmware, middleware, hardware, or any configuration thereof. Further, such components can be realized as virtual software including entities software container, virtual machines, microservices, and the like. In an embodiment, the AIoF component can be integrated in a network interface card (NIC) included in the server or client. Such integration can be achieved using a protocol software or firmware driver.

It should be noted that the disclosed embodiments are not limited for transport of an AI service over RoCE only, but the AIoF protocol can utilize any transport protocol for AI services and/or other types of services. For example, a transport layer or protocol may include the TCP/IP.

A security layer is particularly important in a disaggregated system as disclosed where data flows between different AI resources and clients, at different security levels. To this end, it should be noted that the AIoF can optionally reside in a secured protocol that authenticates the end points of the connection (e.g., client and server) while keeping the data confidential by encrypting the transferred data. Such a configuration incorporates a strong encryption mechanism of the protocol to avoid security attacks, such as man in the middle attacks, eavesdropping, and data replication. In an embodiment, security may be implemented at the transport protocol level. For example, IPsec may be implemented at an IP level which is relevant for UDP and TCP transport that carry AIoF over RDMA and AIoF over TCP, respectively. In another example, transport layer security (TLS) may be implemented as an end-to-end client to server, security protocol for TCP-based transport. Security can also be implemented in the AIoF layer as part of the AIoF protocol, while securing the AIoF payload according to the security indicators compounded from the AIoF header information. The Security Association can be achieved with the AI application level identifiers, for example the CG ID, or the Client_ID, channel or the AI job identifiers and characteristics.

In an embodiment, the AIoF protocol may be transported by transport protocols with a strong encryption. The AIoF entities may be mapped into the transport protocol entities for encryption so that the AI client or server are identified, for example, by an IP endpoint or by a 5 tuple network ID for the IPSEC and TLS case. In an example embodiment, the AIoF information for an AI task including, without limitation, a computer graph (model) of the user, data used for inference, and response data from the server, are all encrypted and authenticated. Furthermore, each AI client is provided with a separate connection and security association (SA) that ensures isolated encryption channels. In this scenario, a virtual path at the server side and the Artificial Intelligence Software Solutions (AISS) are configured to ensure secured AI computing at the server for each specific client. Such configuration achieves a condition similar to a physical allocation of resources at client infrastructures for higher security. This continues the secure isolation provided through the AIoF protocol.

Figure 7:
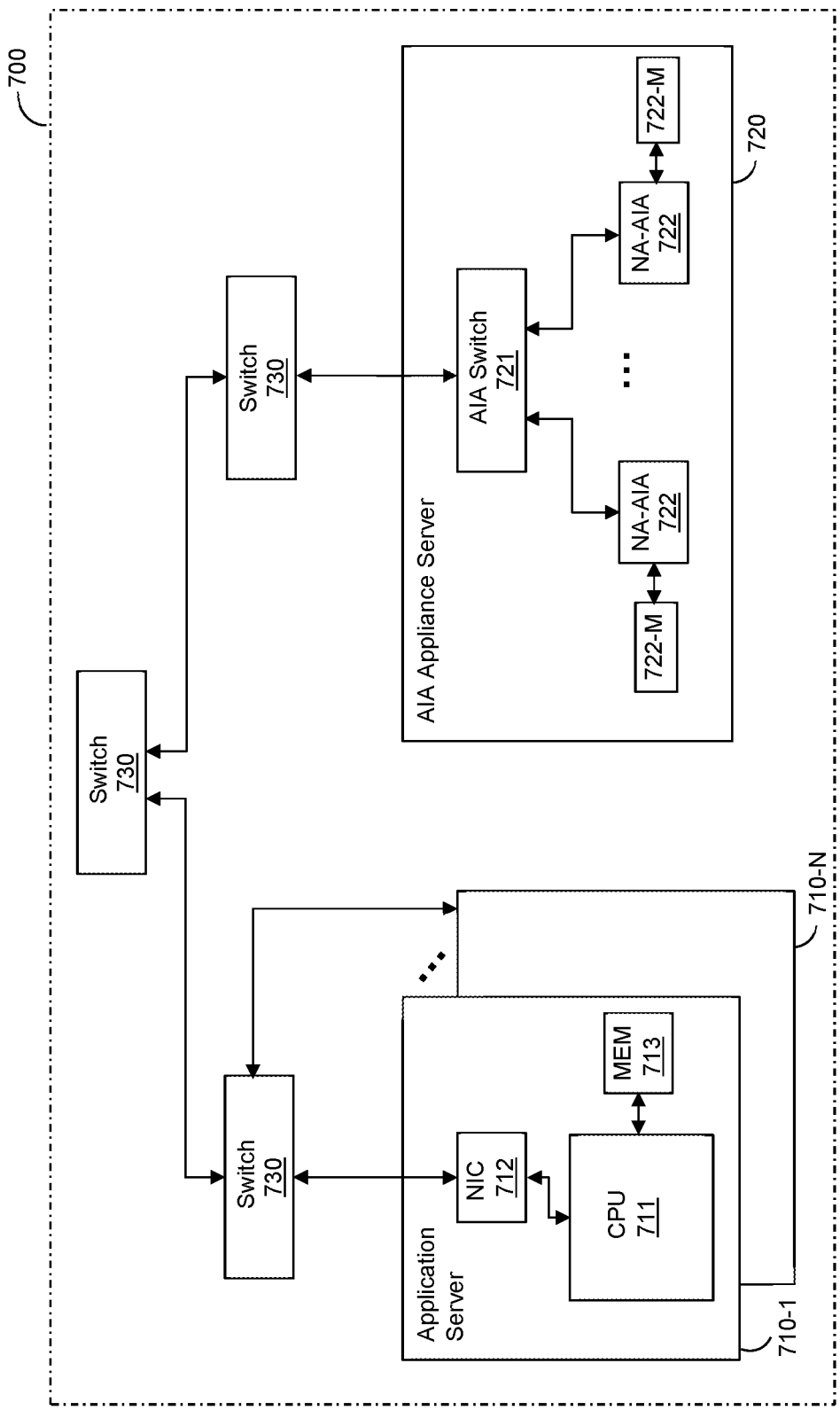
FIG. 7 is a diagram of an AI acceleration system utilizing the AIoF protocol according to an embodiment.

FIG. 7 shows an example diagram of an AI acceleration system 700 utilizing the AIoF protocol. The system 700 is utilized to accelerate the operations of AI processing tasks including, but not limited to, deep-learning tasks.

The system 700 includes a plurality of application servers 710-1 through 710-N, at least one appliance server 720, and a number of switches 730 connecting the various components of the system 700. In an embodiment, each of the switches 730 is an Ethernet switch.

Each application server 710 executes an AI application over an AI software framework. Such a framework may be, for example, TensorFlow®, Caffe, Pytorch®, or CNTK®, and the like. Other frameworks include an application service working as an HTTP client with a remote AI server, such as a Tensorflow® Serving, NVIDIA® Triton server, and Pytorch® serving. In an example embodiment, the application server 710 may include a central processing unit (CPU) 711, a network interface card (NIC) 712, and a memory 713.

Each application server 710 further communicates with the artificial intelligence accelerator (AIA) appliance server 720 that executes specific AI processing tasks. The AIA appliance server 720 is designed according to the disclosed embodiments to accelerate the execution of the AI tasks. The AIA appliance server 720 may include, in one configuration, an AIA switch 721 with a plurality of NA-AIAs 722. Each NA-AIA 722 is coupled to its own memory 722-M. The AIA switch 721 may be an Ethernet switch. The AIA appliance server 720 may be viewed as the AI sever (130, FIG. 1).

The system 700 provides a scalable solution as there is no compute and communication bottlenecks. Specifically, in an embodiment, additional NA-AIAs can be connected to the switch 721, thereby expanding the switch 721 to the AIA appliance server 720. The switch 721 is configured to have enough ports and bandwidth to allow data traffic to be transferred flawlessly between the application servers 710 and the AIA appliance server 720.

According to the disclosed embodiments, further acceleration is achieved by utilizing the disclosed AIoF protocol. Specifically, an acceleration is achieved based on the AIoF protocol to write and/or read to and from a shared memory over network. That is, an AI application can use its memory while the hardware transparently copies the AI model or the data from the application memory to an NA-AIA's memory via the network.

It should be noted that the AIoF protocol can be implemented in other topologies of AI acceleration systems or direct-attached acceleration systems, while providing the described benefits of AI end-to-end QoS and efficient AI job framing and transmission. The AIoF protocol can be implemented with systems including RoCE/TCP and the protocol can run in software on the server side. The AIoF protocol can be implemented with systems that utilize general-purpose CPU for AI tasks and dedicated hardware.

FIG. 8 illustrates an example diagram of the transport abstraction layer 115 at the AI client (120, FIG. 1). The element includes a runtime engine 810, a provisioning engine 820, and an orchestration engine 830. The runtime engine 810 syncs all the operations of the requests received from the AI Application. The provisioning engine 820 provides the programming interface to the provisioning functionality. The orchestration engine 830 provides the programming interface to the management and orchestrate functionality.

According to the disclosed embodiments, the disclosed protocol can support a server chaining. Server chaining functionality allows the spanning of a single compute graph (CG) over multiple AI servers. Due to the overhead of server chaining functionality, it is recommended to strive separating complete compute graphs into different AI servers, if possible, and use a server chaining function as a back-up option. Note, separating a complete compute graph can also be in the same server and not necessarily be implemented with server chaining.

Here, an AI client (e.g., client 120, FIG. 1) maintains a single AIoF connection for a server-chained compute graph. That is, the AI client receives the responses from the same AI server that the client sends the requests to. As such, server-chaining of compute graphs is transparent to clients.

Also required by the protocol is that inter-server requests and responses use the same AIoF connection between the pair of servers. That is, a server that forwards the request to a next server, receives the response from this server on the same AIoF connection.

Figure 9:
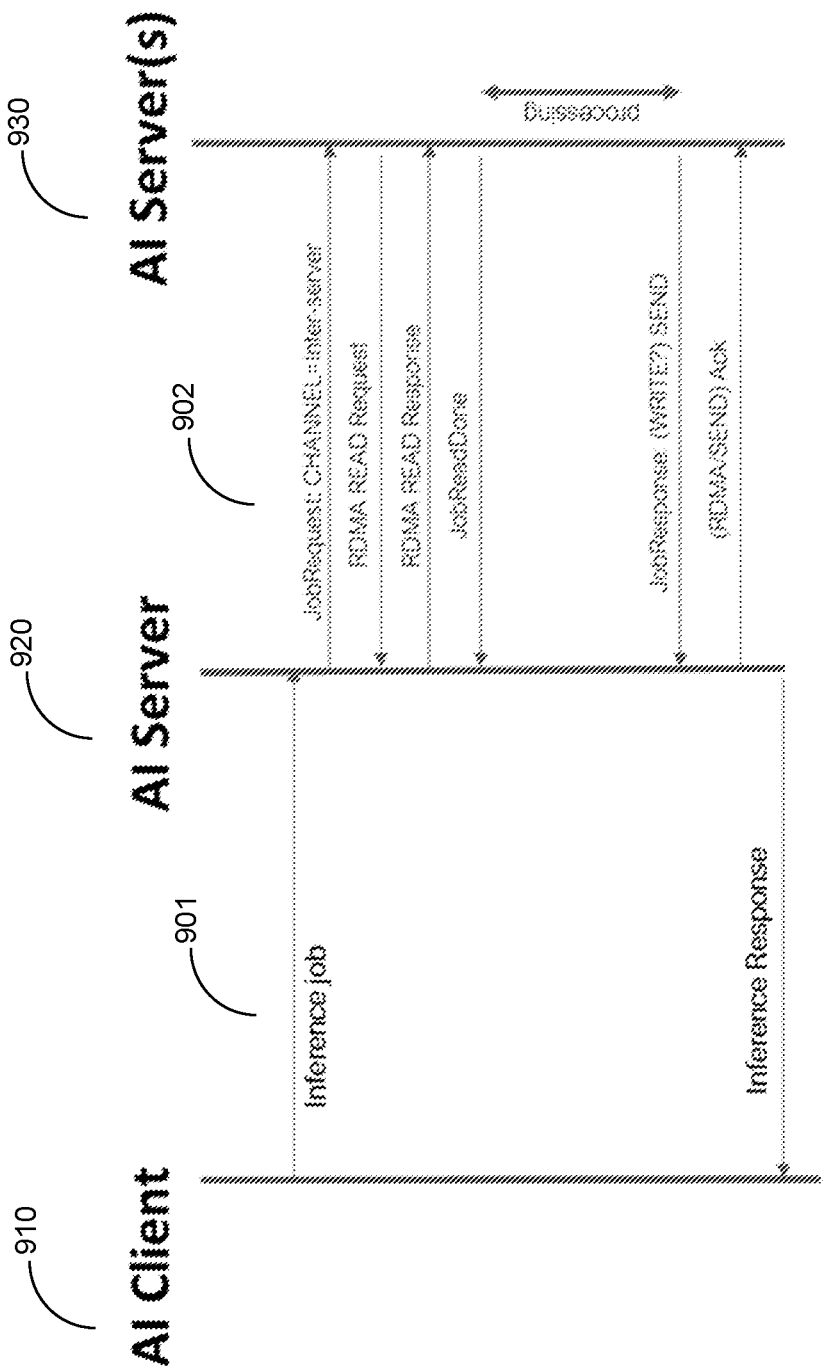
FIG. 9 is a dataflow of a server-chained compute graph according to an embodiment.

FIG. 9 illustrates dataflow of a server-chained compute graph according to an embodiment.

The AI client 910 sends a job request to and receives a job response from a first AI server 920. The job includes the compute graph to process using server chaining. The connection between the AI client 910 and the AI server 920 is over an AIoF connection 901. The first AI server 920 establishes another single connection 902 with one or more AI server (collectively marked as 930). The control and data is transferred over the AIoF connections as discussed above.

It should be noted that AI server 920 is configured to initiate AIoF connection to a distant server (during compute graph provisioning), build and send job requests, receive job responses, receive 'JobReadDone' and release buffer, respond to RDMA READ requests, and SEND and/or WRITE the receiver of the JobResponse.

The embodiments disclosed herein can be implemented as hardware, firmware, software, or any combination thereof. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such computer or processor is explicitly shown.

In addition, various other peripheral units may be connected to the computer platform such as an additional network fabric, storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

What is claimed is:

1. A method for communicating artificial intelligence (AI) tasks between AI resources, comprising:

establishing a connection between a first AI resource and a second AI resource;

encapsulating a request to process an AI task in at least one request data frame compliant with a communication protocol, wherein the at least one request data frame is encapsulated at the first AI resource;

transporting the at least one request data frame over a network using a transport protocol to the second AI resource, wherein the transport protocol provisions transport characteristics of the AI task, and wherein the transport protocol is different than the communication protocol; and defining a plurality of queues to support messages exchanged between the first and second AI resources, wherein each of the plurality of queue are allowed to differentiate different users, flows, AI tasks, and service priorities.

2. The method of claim 1, further comprising:

encapsulating a response resulted in the processing of the AI task in at least one response data frame compliant with the communication protocol, wherein the at least one response data frame is encapsulated at the second AI resource; and transporting the at least one response data frame over the network using the transport protocol to the second AI resource.

3. The method of claim 2, wherein each of the request data frame and the response data frame includes a header portion and a payload portion, wherein the payload portion is structured to carry the data to process the AI task.

4. The method of claim 3, wherein the header portion includes a plurality of fields for provisioning transport characteristics of the AI tasks, the characteristics include at least one of: an AI task type, a job identifier (JID), a computational graph identifier (CGID), a client identifier (CLIENT ID), a length of a payload data, a source address, a destination address, and a data information.

5. The method of claim 1, further comprising:

fragmenting the at least one request data frame into consecutive transport protocol packets; and encapsulating the fragmented data frame in payload portions of the transport protocol packets.

6. The method of claim 2, further comprising:

structuring the at least one response data frame into consecutive transport protocol packets; and encapsulating the data frame in payload portions of the transport protocol packets.

7. The method of claim 6, wherein the at least one request data frame and the at least one response data frame are transported through a handshake process or send and read operations.

8. The method of claim 1, wherein the transport protocol is any one of: a Transmission Control Protocol (TCP), a remote direct memory access (RDMA), a RDMA over converged Ethernet (RoCE), NVMe or NVMeoF, and an InfiniBand.

9. The method of claim 1, wherein a physical medium of the network is at least a fabric.

10. The method of claim 1, wherein establishing the connection further comprises any one of:

initiating a connection request by the first AI resource by sending a list of provisions to the second AI resource;

receiving a response to the connection request by the second AI resource;

creating an administrator channel to enable connection of the communication protocol over the transport protocol;

establishing a connection for the transport protocol between the first AI resource and the second AI resource; and establishing a connection for the communication protocol between the first AI resource and the second AI resource.

11. The method of claim 2, further comprising:

securing the established connection between the first AI resource and the second AI resource.

12. The method of claim 11, further comprising:

setting different security levels to various data flows for the first and second AI resources.

13. The method of claim 1, wherein the first AI resource is an AI client, and wherein the second AI resource is at least one AI server configured to accelerate an execution of AI tasks.

14. The method of claim 13, further comprising:

spanning a single compute graph (CG) over to at least one AI server.

15. The method of claim 1, further comprising:

offloading processing of the at least one request data frame by a host of the second AI resource.

16. The method of claim 14, further comprising:

translating a direct memory access to a direct data transfer in the protocol level.

17. The method of claim 1, further comprising:

using a credit-based flow control mechanism to transfer messages between the first AI resource and the second AI resource, thereby avoiding congestion on compute resources.

18. A non-transitory computer readable medium having stored thereon instructions for causing a processing circuitry to execute the method of claim 1.

19. A system configured as artificial intelligence (AI) task execution, comprising:

a processing circuitry; and a memory, the memory containing instructions that, when executed by the processing circuitry, configure the system to:

establish a connection with a second AI resource;

encapsulate a request to process an AI task in at least one request data frame compliant with a communication protocol;

transport the at least one request data frame over a network using a transport protocol to the second AI resource, wherein the transport protocol provisions the transport characteristics of the AI task, and wherein the transport protocol is different than the communication protocol; and define a plurality of queues to support messages exchanged between the first and second AI resources, wherein each of the plurality of queue are allowed to differentiate different users, flows, AI tasks, and service priorities.

20. The system of claim 19, wherein the at least one request data frame includes a header portion and a payload portion, wherein the payload portion is structured to carry the data to process the AI task.

21. A system configured as an artificial intelligence (AI) task execution, comprising:

a processing circuitry; and a memory, the memory containing instructions that, when executed by the processing circuitry, configure the system to:

encapsulate a response resulted in the processing of an AI task in at least one response data frame compliant with a communication protocol;

transport the at least one response data frame over a network using a transport protocol to a second AI resource, wherein the transport protocol provisions transport characteristics of the AI task, and wherein the transport protocol is different than the communication protocol; and define a plurality of queues to support messages exchanged between the first and second AI resources, wherein each of the plurality of queue are allowed to differentiate different users, flows, AI tasks, and service priorities.

22. The system of claim 21, wherein the at least one response data frame includes a header portion and a payload portion, wherein the payload portion is structured to carry the data to process the AI task.

* * * * *